United States Patent
Kim et al.

(10) Patent No.: US 9,467,732 B2
(45) Date of Patent: Oct. 11, 2016

(54) DISPLAY APPARATUS AND CONTROL METHOD FOR DISPLAYING AN OPERATIONAL STATE OF A USER INPUT

(71) Applicant: SAMSUNG ELECTRONICS CO., LTD., Suwon-si (KR)

(72) Inventors: Min-hyung Kim, Seoul (KR); Chang-soo Lee, Seoul (KR); Sang-hee Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/661,395

(22) Filed: Mar. 18, 2015

(65) Prior Publication Data

US 2015/0195607 A1    Jul. 9, 2015

Related U.S. Application Data

(63) Continuation of application No. 14/059,887, filed on Oct. 22, 2013.

(30) Foreign Application Priority Data

Nov. 2, 2012  (KR) .................. 10-2012-0123774

(51) Int. Cl.
*G06F 1/00*     (2006.01)
*H04N 21/431*   (2011.01)
(Continued)

(52) U.S. Cl.
CPC .......... *H04N 21/4312* (2013.01); *G06F 3/017* (2013.01); *G06F 3/033* (2013.01);
(Continued)

(58) Field of Classification Search
CPC .......... G06F 3/041; G06F 3/033; G06F 3/01; G06F 3/16; G06F 3/0485; G06F 5/08
See application file for complete search history.

(56) References Cited

U.S. PATENT DOCUMENTS 5,655,093 A    8/1997   Frid-Nielsen
6,519,566 B1   2/2003   Boyer et al.
(Continued)

FOREIGN PATENT DOCUMENTS

KR    2000-0062684 A    10/2000
KR    10-2002-0057482 A    7/2002
(Continued)

OTHER PUBLICATIONS

Communication dated Feb. 19, 2014 issued by the International Searching Authority in counterpart International Application No. PCT/KR2013/009813 (PCT/ISA/210).
(Continued)

*Primary Examiner* — Michael Faragalla
(74) *Attorney, Agent, or Firm* — Sughrue Mion, PLLC

(57) ABSTRACT

A display apparatus and a control method thereof for displaying an operational state of a user input are provided. The display apparatus includes: an image processor configured to process an image signal; a display configured to display an image thereon based on the processed image signal; a user input configured to receive a user's input; and a controller configured in response to the user's input being received, control the display to display thereon a cursor moved in correspondence with a location of the user's input as an icon showing an operational state of the user's input. Thus, a user may intuitively recognize the operational state of the user's input and may obtain prompt feedback on the input result without suspending his/her interaction.

20 Claims, 14 Drawing Sheets

(51) Int. Cl.

| | |
|---|---|
| G06F 3/0481 | (2013.01) |
| G06F 3/033 | (2013.01) |
| G06T 11/00 | (2006.01) |
| H04N 5/445 | (2011.01) |
| H04N 21/422 | (2011.01) |
| G06F 3/0346 | (2013.01) |
| G06F 3/01 | (2006.01) |
| G06F 3/0482 | (2013.01) |
| G06F 3/0485 | (2013.01) |
| G06F 3/16 | (2006.01) |
| H04N 5/44 | (2011.01) |

(52) U.S. Cl.
CPC .......... *G06F 3/0346* (2013.01); *G06F 3/0482* (2013.01); *G06F 3/0485* (2013.01); *G06F 3/04812* (2013.01); *G06F 3/04817* (2013.01); *G06F 3/167* (2013.01); *G06T 11/00* (2013.01); *H04N 5/4403* (2013.01); *H04N 5/44582* (2013.01); *H04N 21/42204* (2013.01); *H04N 21/42222* (2013.01); *G06F 2203/0381* (2013.01); *H04N 2005/44521* (2013.01)

(56) References Cited

U.S. PATENT DOCUMENTS

| | | | |
|---|---|---|---|
| 2003/0142123 | A1 | 7/2003 | Malamud et al. |
| 2009/0140978 | A1* | 6/2009 | Louch ............................ 345/157 |
| 2009/0319896 | A1 | 12/2009 | Green et al. |
| 2010/0283735 | A1 | 11/2010 | Kim et al. |
| 2011/0058711 | A1 | 3/2011 | Noda et al. |
| 2011/0289461 | A1 | 11/2011 | Jacourtz |
| 2012/0127072 | A1 | 5/2012 | Kim |
| 2012/0194428 | A1 | 8/2012 | Kwon et al. |
| 2012/0200497 | A1 | 8/2012 | Nasiri et al. |
| 2012/0262370 | A1* | 10/2012 | Ko et al. ....................... 345/157 |
| 2013/0063345 | A1* | 3/2013 | Maeda ................... G06F 3/017 345/156 |

FOREIGN PATENT DOCUMENTS

| | | |
|---|---|---|
| KR | 10-2010-0000744 A | 1/2010 |
| KR | 10-2010-0050577 A | 5/2010 |
| KR | 10-2011-0032365 A | 3/2011 |
| KR | 10-2012-0116147 A | 10/2012 |
| WO | 2012/011263 A1 | 1/2012 |

OTHER PUBLICATIONS

Communication dated Oct. 5, 2015, issued by the Korean Intellectual Property Office in counterpart Korean Application No. 10-2012-0123774.

Communication dated Dec. 18, 2015, issued by the United States Patent and Trademark Office in counterpart U.S. Appl. No. 14/059,887.

Communication issued on Jun. 4, 2015 by the Korean Intellectual Property Office in related Application No. 10-2012-0123774.

Communication issued on Jun. 9, 2015 by the European Patent Office in related Application No. 15155402.9.

Communication issued on Jun. 18, 2015 by the European Patent Office in related Application No. 13191019.2.

Communication issued on Jun. 22, 2015 by the European Patent Office in related Application No. 15155402.9.

Communication issued on Jun. 18, 2015 by the United States Patent and Trademark Office in related U.S. Appl. No. 14/059,887.

Communication dated Feb. 6, 2016 issued by the Korean Intellectual Property Office in counterpart Korean Patent Application No. 10-2012-0123774 English Translation.

Communication dated Apr. 12, 2016 issued by the European Patent Office in counterpart European Patent Application No. 15 155 402.9.

Communication dated Apr. 13, 2016 issued by the European Patent Office in counterpart European Patent Application No. 13 191 019.2.

* cited by examiner

FIG. 7
(a)
Waiting
(b)
Loading

FIG. 13
   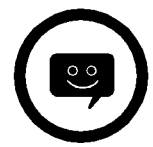 
Smart Guide   Web Browser   Apps   Communication   Help

DISPLAY APPARATUS AND CONTROL METHOD FOR DISPLAYING AN OPERATIONAL STATE OF A USER INPUT

CROSS-REFERENCE TO RELATED APPLICATION

This is a continuation application of U.S. patent application Ser. No. 14/059,887, filed on Oct. 22, 2013, which claims priority from Korean Patent Application No. 10-2012-0123774, filed on Nov. 2, 2012 in the Korean Intellectual Property Office, the disclosures of which are incorporated herein by reference, in their entireties.

BACKGROUND

1. Field

Apparatuses and methods consistent with the exemplary embodiments relate to a display apparatus and a control method thereof. More particularly, exemplary embodiments relate to a display apparatus and a control method thereof which displays an operational state of a user's input.

2. Description of the Related Art

A display apparatus such as a TV processes image signals/image data supplied by various external image supply sources or stored therein, and displays an image on a display panel based on the processed image signals/image data. A display apparatus which is provided to users includes a TV, a monitor, etc., and a display apparatus which is implemented as a TV which processes a broadcasting signal transmitted from the outside, according to various image processing operations such as decoding, scaling, etc., and provides an image of a desired broadcasting channel.

The display apparatus such as a smart TV may receive a user's input command in various input modes such as through a remote controller, mouse, keyboard, voice input, hand gesture, etc. The display apparatus may display a pointing cursor on a location which corresponds to a user's input on a screen.

However, the display apparatus displays a pointing cursor of the same shape always regardless of input mode or input command, and a user may not intuitively identify the input state or obtain feedback on the result of the input. Accordingly, a user's interaction is cut off and a user is distracted from his/her input, and may feel inconvenienced.

SUMMARY

The foregoing and/or other aspects may be achieved by providing a display apparatus including: an image processor configured to process an image signal; a display configured to display an image thereon based on the processed image signal; a user input configured to receive a user's input; and a controller configured to control, in response to the user's input being received, the display in order to display thereon as an icon showing an operational state of the user's input a cursor moved in correspondence with a location of the user's input.

The operational state of the user's input may include an input mode of the user input.

The input mode may include at least one of a plurality of input modes according to an input from remote controller, a mouse input, a keyboard input, a gesture input, a touch input and a voice input.

The operational state of the user's input may include at least one of an operational state according to an input command and a command that may be input at a location of the user's input.

The operational state according to the input command may include at least one of roll-over, pushing, waiting and loading. The inputtable command includes at least one of back, scroll, refresh and slider.

The operational state of the user's input may further include information on an object that exists at the location of the user's input, and the information on the object may include at least one of content, web browser, smart guide, application, communication and help.

The displayed icon may visualize a function which corresponds to the operational state.

The controller may control the display to emphasize and display thereon one of a plurality of objects in which the cursor is located.

The controller may control the display to give an animation effect to the icon.

The controller may control the display to display thereon an icon which corresponds to the operational state in addition to a basic cursor pointing the location of the user's input.

One or more exemplary embodiments may provide a method of controlling a display apparatus including: receiving a user's input; and displaying a moved cursor which corresponds to a location of the user's input, as an icon showing an operational state of the user's input.

The operational state of the user's input may include an input mode of the user input.

The input mode may include at least one of a plurality of input modes according to a remote controller input, a mouse input, a keyboard input, a gesture input, a touch input and a voice input.

The operational state of the user's input may include at least one of an operational state according to an input command and a command that may be input at a location of the user's input.

The operational state according to the input command may include at least one of roll-over, pushing, waiting and loading, and the inputtable command includes at least one of back, scroll, refresh and slider.

The operational state of the user's input may further include information relating to an object that exists at the location of the user's input, and the information relating to the object may include at least one of content, web browser, smart guide, application, communication and help.

The displayed icon may visualize a function which corresponds to the operational state.

The control method may further include emphasizing and displaying an object from a plurality of objects, where the cursor is located.

The control method may further include giving the icon an animation effect.

The displaying of the icon may include displaying an icon which corresponds to the operational state in addition to a basic cursor pointing the location of the user's input.

An exemplary embodiment may further provide a display apparatus including: an image processor configured to process an image signal; and a controller configured to control, in response to a user's input being received, a display in order to display thereon a cursor as an icon showing an operational state of the user's input, which is moved in correspondence with a location of the user's input.

The display apparatus may further provide a display configured to display an image thereon based on the processed image signal and a user input configured to receive a user's input; wherein an operational state of the user's input comprises an input mode of the user input.

The display apparatus may further provide wherein the input mode included at least one of a plurality of input modes according to a remote controller input, a mouse input, a keyboard input, a gesture input, a touch input and a voice input.

BRIEF DESCRIPTION OF THE DRAWINGS

The above and/or other aspects will become apparent and more readily appreciated from the following description of the exemplary embodiments, taken in conjunction with the accompanying drawings, in which:

FIGS. 5 to 7 illustrate an example of displaying a cursor as an icon showing an operational state according to a currently input command according to an exemplary embodiment;

FIGS. 12 and 13 illustrate an example of displaying a cursor as an icon showing information on an object at a location of a user's input according to an exemplary embodiment.

DETAILED DESCRIPTION OF THE EXEMPLARY EMBODIMENTS

Figure 1:
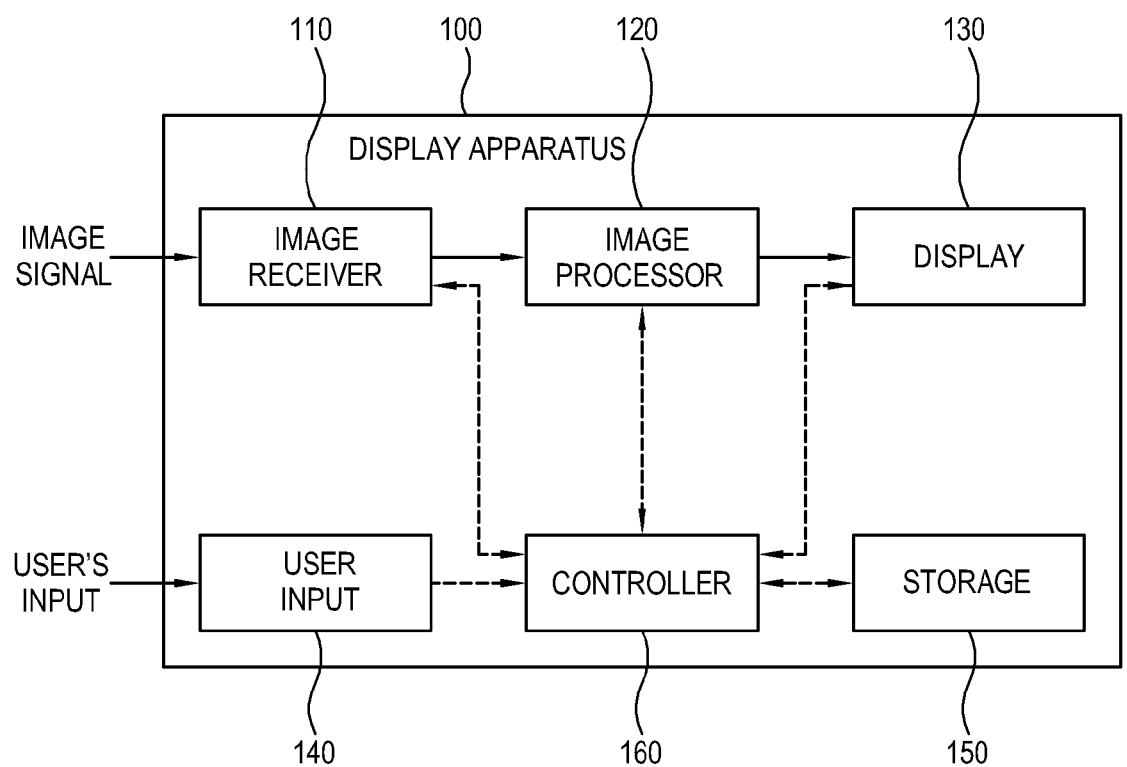
FIG. 1 is a block diagram of a display apparatus according to an exemplary embodiment.

Below, exemplary embodiments will be described in detail with reference to accompanying drawings so as to be easily understood by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram of a display apparatus 100 according to an exemplary embodiment.

As shown therein, the display apparatus 100 according to an exemplary embodiment processes an image signal supplied by an external image supply source (not shown) according to a preset image processing operation, and displays an image based on the processed image signal.

The display apparatus 100 may receive preset commands/data/information/signals which are generated to be remotely controlled according to various input modes such as a remote controller, mouse, keyboard, voice input, hand gesture, etc.

The display apparatus 100 according to an exemplary embodiment is implemented as a TV which displays a broadcast image based on broadcast signals/broadcast information/broadcast data transmitted by a transmission apparatus of a broadcast station. However, the spirit of the exemplary embodiment is not limited to the exemplary embodiment of the display apparatus 100. The display apparatus 100 may include other various types of exemplary embodiments which display an image, in addition to being implemented as a TV.

The type of an image which is displayable by the display apparatus 100 is not limited to the broadcast image, and may include a video, still image, applications, on screen display (OSD), a graphic user interface (GUI) to control various operations, based on signals/data transmitted by various signal supply sources (not shown). The display apparatus 100 according to an exemplary embodiment may further display a pointing cursor (hereinafter, to be also called "cursor") that is movably displayed and which corresponds to a location of a user's input.

According to an exemplary embodiment, the display apparatus 100 may be implemented as a smart TV. The smart TV may receive and display a broadcasting signal in real-time, and has a web browser function to concurrently display a broadcasting signal and search and consume various contents through the Internet and to provide a convenient user environment. The smart TV includes an open software platform to provide interactive service for a user. Accordingly, the smart TV may provide a user with an application providing various contents, e.g., predetermined service through the open software platform. Such application may provide various types of services, and includes an application providing SNS, finance, weather, maps, music, movies, games, e-books, etc. In response the display apparatus 100 being implemented as a smart TV, the apparatus may be functionally divided into a first block to receive and process a broadcasting signal and an image signal, and a second block to provide an Internet service through a web browser and an application through the open software platform.

As shown in FIG. 1, the display apparatus 100 includes an image receiver 110 configured to receive an image signal, an image processor 120 configured to process the image signal received through the image receiver 110, a display 130 configured to display an image thereon based on the image signal processed by the image processor 120, a user input 140 configured to receive a user's input, a storage 150 configured to store therein various data, and a controller 160 configured to control the display apparatus 100.

The image receiver 110 receives and transmits an image signal to the image processor 120, and varies depending on a standard of a received signal or type of image supply source, and the display apparatus 100. For example, the image receiver 110 may receive a radio frequency (RF) signal in a wireless manner from a broadcasting station (not shown), and may receive image signals in a wired manner according to standards such as composite video, component video, super video, SCART, high definition multimedia interface (HDMI), etc. In response to the image signal including a broadcast signal, the image receiver 110 includes a tuner to tune the broadcast signal by channel.

The image signal may be input by an external device, e.g., by a personal computer (PC), AV device, smart phone, smart pad, etc. The image signal may result from data transmitted through a network such as the Internet. In this case, the display apparatus 100 may further include a network communicator (not shown) which performs communication through a network. The image signal may result from data stored in a non-volatile storage 150 such as a flash memory, hard disc drive, etc. The storage 150 may be provided within/outside the display apparatus 100. In response to the storage 150 being provided outside the display apparatus 100, the apparatus may further include a connector (not shown) to which the connector 150 is connected.

The image processor 120 processes an image signal according to preset various image processing operations. The image processor 120 outputs the processed image signal to the display 130, on which an image may be displayed on the basis of the processed image signal.

The image processing operation of the image processor 120 may include, but not limited to, a decoding operation which corresponds to various image formats, a de-interlacing operation, a frame refresh rate conversion, a scaling operation, a noise reduction operation for improving an image quality, a detail enhancement operation, a line scanning operation, etc. The image processor 120 may be implemented as individual groups independently performing the foregoing operations, or as a system-on-chip (SoC) which integrates the functions.

The display 130 displays an image thereon based on an image signal processed by the image processor 120. The display type of the display 130 includes, but not limited to, a liquid crystal display (LCD), a plasma display panel (PDP), a light-emitting diode (LED), an organic light emitting diode (OLED), a surface-conduction electron-emitter, a carbon nano-tube, nano-crystal, etc.

The display 130 may further include additional elements depending upon its configuration. For example, the display 130 as LCD includes an LCD panel (not shown), a backlight (not shown) emitting light to the LCD panel, and a panel which drives substrate (not shown) driving the LCD panel.

The display 130 according to an exemplary embodiment displays a cursor as an example of the OSD which corresponds to a location of a user's input detected by the user input 140 (to be described later). The cursor is moved according to the detected user's input. The cursor includes an icon showing an operational state of the user's input. The icon includes graphics and texts, and texts may include numbers, characters, special symbols, etc.

If the display 130 is a touch screen, a user may touch the cursor of the display unit 130 and transmit a command to the controller 160 corresponding to the user's input.

The user input 140 transmits preset various control commands or unlimited information to the controller 160 by a user's manipulation and input. The user input 140 may be implemented as a menu key and an input panel installed in an external part of the display apparatus 100, or a remote controller which is separated/spaced from the display apparatus 100, a mouse, a keyboard, and a voice acquiring apparatus, or a motion sensor which senses a user's hand gesture.

In response to the user input 140 being implemented as a remote controller, a mouse, a keyboard or a voice acquiring apparatus, there is no limitation on transmitting a user's input through the user input 140 to the controller 160, and the transmission may be performed through wired or wireless communication. The wired communication includes serial, Ethernet, etc. while the wireless communication includes infrared communication, radio frequency (RF), Zigbee®, Bluetooth®, etc. In this case, the display apparatus 100 may further include wired/wireless communication module which receives a signal which corresponds to a user's input transmitted by the user input 140 and transmits the signal to the controller 160.

The user input 140, which is implemented as a remote controller, may include a touch sensor (touch pad) configured to receive a user's touch input. The user's touch input may vary including tap, click, double click, drag, slide, flicking, etc. The user input 140, which is implemented as a remote controller may further include a pointing device equipped with a motion sensor. The motion sensor may include a gyro sensor an angular velocity sensor, and a geomagnetic sensor. The remote controller calculates motion information based on a sensing result of the motion sensor, and transmits a corresponding command to the display apparatus 100.

The user input 140 according to an exemplary embodiment may include the touch sensor provided not only in the remote controller but also in a keyboard, or additional device, or in a main body of the display apparatus 100. The user input 140 may detect a user's hand gesture through a motion sensor provided in the display apparatus 100 or in an additional device. The intensity of the hand gesture is decided by one of a moving distance, moving speed or moving area of a user's hand, or a combination thereof. The controller 160 may calculate motion information of the hand gesture based on angular velocity and/or acceleration of a user's hand as sensed by the motion sensor, and compare the motion information with information stored in the storage 150 and adjust the motion information based on the comparison result. The result as a predetermined command may control the display apparatus 100.

The user input 140 which is implemented as a voice acquiring apparatus may include a voice acquirer implemented as a microphone receiving a user's voice and a voice converter to convert an input voice into an electrical voice signal (digital signal). The voice acquiring apparatus according to an exemplary embodiment may be provided in the main body of the display apparatus 100, or as an additional apparatus performing data communication with the display apparatus 100. In response to the user input 140 including a voice acquiring apparatus, the display apparatus 100 includes a voice engine (not shown) to recognize a voice which corresponds to the voice signal into which the user's voice has been converted. The storage 150 may store therein various data to recognize a user's voice, e.g., may store voice recognition information which corresponds to a voice signal.

The user input 140 may include a user interface (UI; hereinafter, to be also called graphic user interface (GUI)) which is displayed on the display 140. In response to the display 130 being a touch screen, the user input 140 may transmit, to the controller 160, a command which corresponds to a user's input that is generated by a user touching a UI of the display 140. The UI includes a cursor that is moved in correspondence to a location of a user's input. A user may manipulate a direction key (four direction button) provided in a remote controller, a touch sensor, a mouse, a keyboard, a hand gesture, etc., to select a UI from the display 130.

The spirit of the exemplary embodiments is not limited to the foregoing, and examples of various user inputs may apply.

The display apparatus 100 according to an exemplary embodiment operates in one of a plurality of input modes according to an operation of the user input 140. The plurality of input modes may include at least one of input modes according to a remote controller input, mouse input, keyboard input, gesture input, touch input and voice input.

The storage 150 stores therein unlimited data through a control of the controller 160. The storage 150 includes a non-volatile memory such as a flash memory or a hard disc drive. The storage 150 is accessed by the controller 160, and data stored therein may be read/written/modified/deleted/updated by the controller 160.

The data stored in the storage 150 includes an operating system (OS) configured to drive the display apparatus 100, and various applications which are executed on the OS, image data, and additional data.

The controller 160 controls various elements of the display apparatus 100. For example, the controller 160 controls the image processor 120 to process an image, and performs a control operation in response to a command from the user input 140 to thereby control overall operations of the display apparatus 100.

In response to a user's input being received through the user input 140, the controller 160 according to an exemplary embodiment controls the display 130 to display thereon a cursor moved in correspondence with a location of the user's input, as an icon showing an operational state of the user's input. The controller 160 may process the cursor to have an animation effect and may display the animating cursor on the display unit 130. For example, in response an operation of a user's input being detected; the controller 160 displays the cursor on the display 130, but displays a gradually-increasing cursor. In response to no user's input being provided for a predetermined time, the controller 160 controls the display 130 to not display the cursor thereon, but rather displays a gradually-decreasing cursor.

The operational state of the user's input according to an exemplary embodiment includes an input mode of the user input 140. The image showing the operational state of the cursor visualizes the function of the display apparatus 100 which corresponds to the input mode. For example, referring to cursors 20 and 30 shown in FIGS. 2 to 4, the display apparatus 100 has a voice input, mouse input, keyboard input and hand gesture input functions, according to the implemented input mode.

Figure 2:
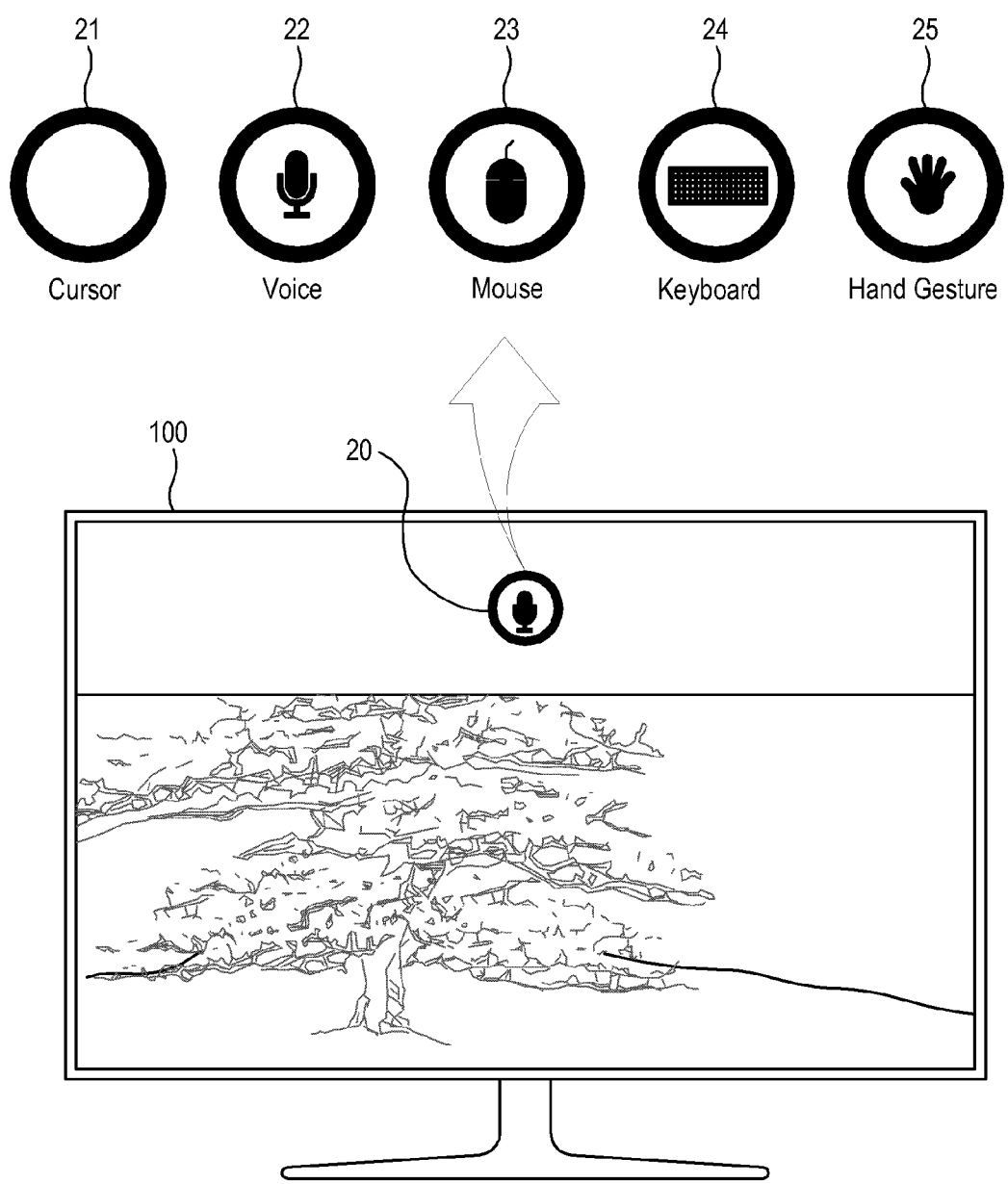
FIGS. 2 and 3 illustrate an example of displaying a cursor as an icon showing an input mode of the display apparatus according to an exemplary embodiment.
Figure 3:
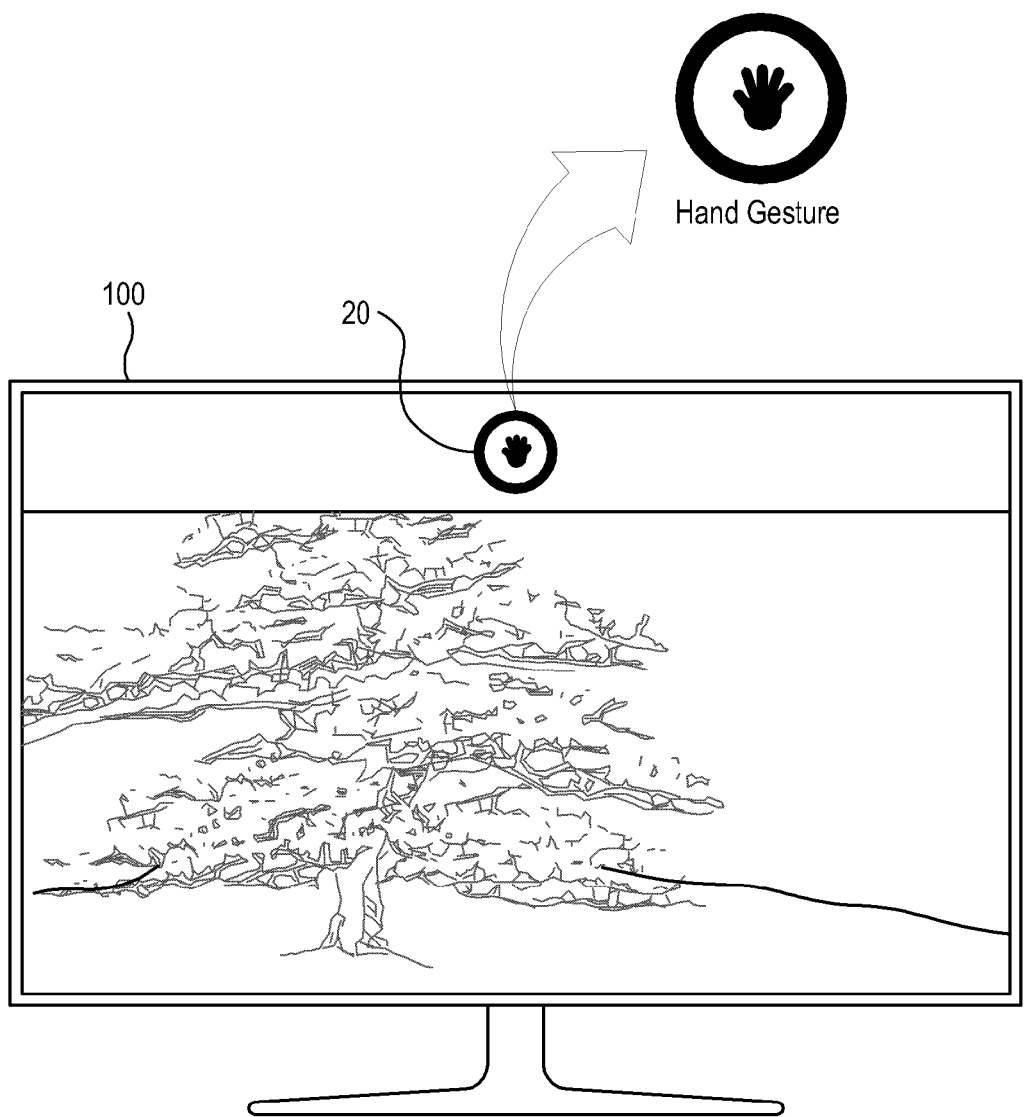

FIGS. 2 and 3 illustrate an example of displaying a cursor as an icon showing the input mode of the display apparatus 100, according to the exemplary embodiment.

More specifically, in response to the input mode of the display apparatus 100 being a voice input mode, the controller 160 may display the cursor 20 as an icon which corresponds to the input mode as shown in FIG. 2. For example, the cursor 20 may be displayed as an icon corresponding to the operational state of the user input 140, in addition to the basic cursor icon 21 pointing out a location of the user's input as in FIG. 2, i.e., as an icon 22 visualizing a microphone for a user to intuitively recognize the input mode.

In an exemplary embodiment, the display apparatus 100 includes various input modes depending on the type of user input 140 that has been implemented. The cursor 20 may be displayed as icons showing various input modes such as a mouse input mode icon 23, a keyboard input mode icon 24, and a hand gesture input mode icon 25 in FIG. 2, as well as the voice input mode icon 22.

For example, in response to the input mode being a hand gesture input mode, the cursor 20 may be displayed as a graphic icon 25 visualizing a hand in addition to the basic cursor icon 21, for a user to intuitively recognize the input mode.

Then, a user may obtain feedback on the input mode through the icon 20 displayed on the display 130, and easily recognize a current input device.

Figure 4:
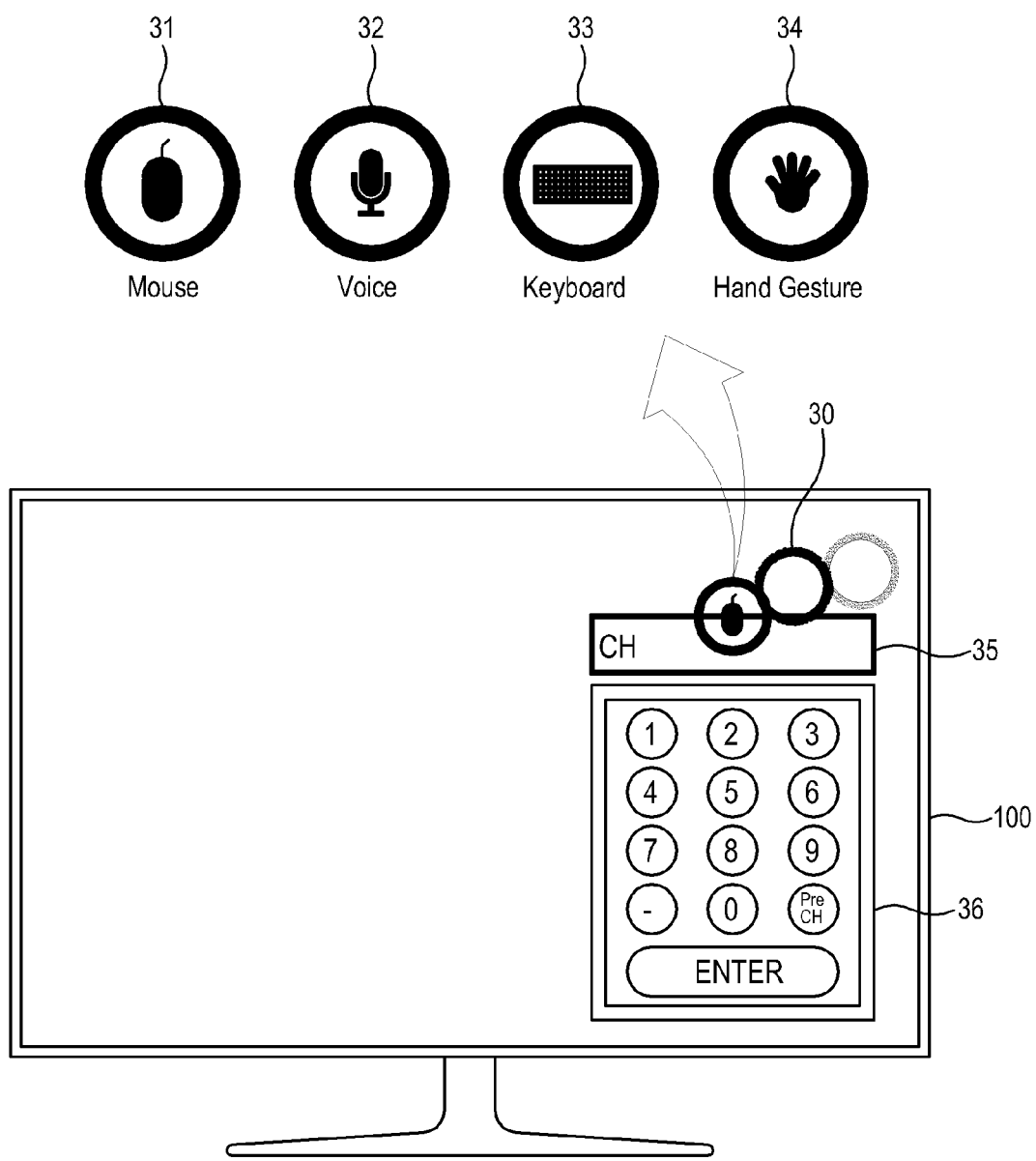
FIG. 4 illustrates another example of displaying a cursor as an icon showing an input mode of the display apparatus according to an exemplary embodiment.

FIG. 4 illustrates another example of displaying a cursor as an icon showing the input mode of the display apparatus 100, according to an exemplary embodiment.

As shown therein, while an input window 35 and a number keypad 36 are displayed on the display 140 for a user to select a channel, the display apparatus 100 may receive a user's manipulation for moving the cursor 30 to the input window 35. The controller 160 may display the cursor 30 as an icon which corresponds to the input mode as in FIG. 4. For example, in response the input mode of the display apparatus 100 being a mouse input mode, the cursor may be displayed as an icon 31 visualizing a mouse graphic for a user to intuitively recognize the input mode.

A user may recognize the input mode through the cursor 30 displayed on the input window 35, and may input a channel number in the input window 35 by clicking the number of the number keypad 36 through the mouse.

In an exemplary embodiment, the display apparatus 100 includes various input modes depending on the type of implemented user input 140. The cursor 30 may be displayed as icons showing various input modes such as the voice input mode icon 32, a keyboard input mode icon 33, and a hand gesture input mode icon 34 in FIG. 4, as well as a mouse input mode icon 31.

For example, in response to the input mode being a voice input mode, the cursor 30 located in the input window 35 may be displayed as a graphic icon 32 visualizing a microphone, and a user may speak a desired channel number to select a channel.

FIG. 4 illustrates an exemplary embodiment in which the cursor 30, located in the input window 35 to which the channel number is input shows the input mode, but the location of the cursor is not limited to the foregoing, and alternately may be located in various input windows (e.g. search word input window of a web browser, etc.) to which a user may input, as well as channel numbers.

The operational state of the user's input according to an exemplary embodiment may further include an operation state according to the current input command or a command that may be input from the location of the user's input. The image showing the operational state of the cursor may visualize the function of the display apparatus 100 which corresponds to the command.

Figure 5:
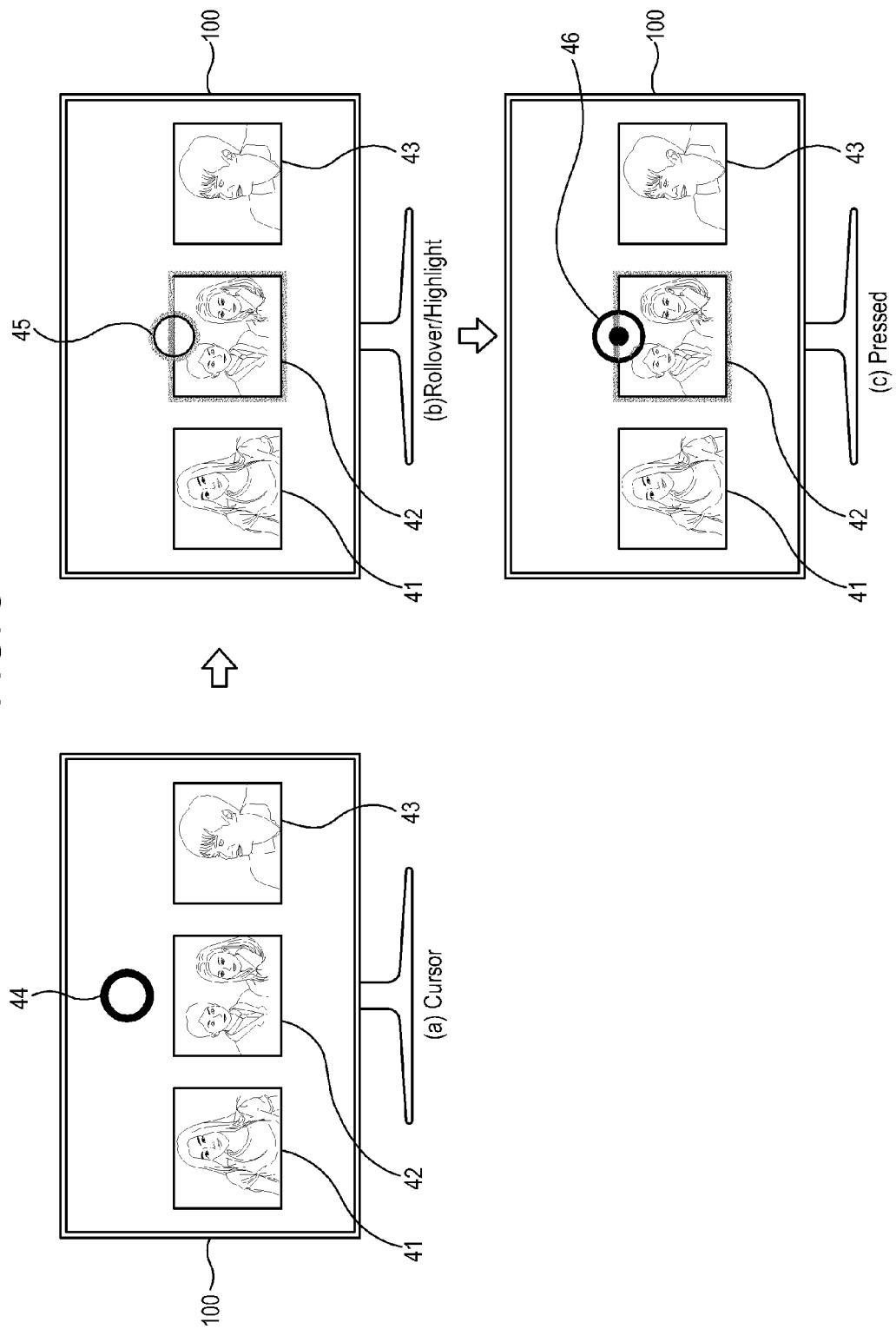
Figure 6:
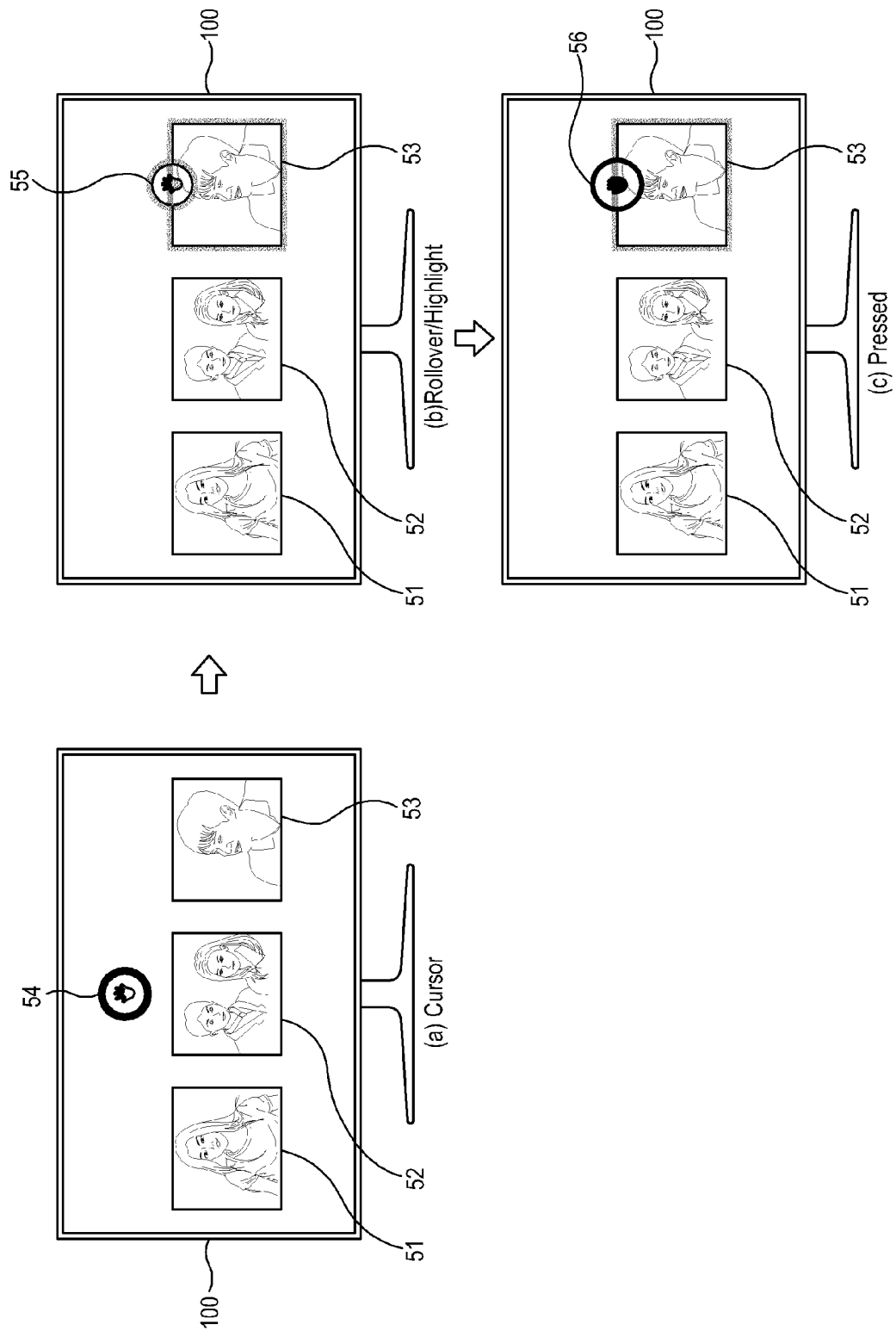

FIGS. 5 to 7 illustrate an example of displaying a cursor as an icon showing the operational state, depending on a current input command.

As shown in FIGS. 5 and 6, in response to a user manipulating the user input 140 in various manners, the controller 160 controls the display 130 to display the changed location of the cursor which corresponds to the user's manipulation.

For example, in response to the input mode of the display apparatus 100 being a remote controller input mode, while a plurality of optional objects 41, 42 and 43 and a cursor (basic cursor) 44 are displayed on the display 130 as in (a) in FIG. 5, a user may select one of the plurality of objects 41, 42 and 43 by manipulating the remote controller as the user input 140.

The controller 160 moves and displays the location of the cursor 44 which corresponds to the location of the remote controller manipulated by a user, and in response to the location of the user's input becoming adjacent to the predetermined object 42, controls the display 130 to change the image of the cursor into an icon visualizing the operational state, e.g. rollover. That is, the cursor 45 may be an icon visualizing a metaphor meeting the current input condition.

The object 42 in which the cursor is located may be emphasized by highlight, etc. In response to the object that is adjacent to the cursor not being an option, the display apparatus 100, according to an exemplary embodiment may disable (e.g., by shading) the object.

In response to a user selecting the object 42, the controller 160 controls the display 130 to change the image of the cursor 46 into an icon visualizing the function showing the operational state, i.e., a pressed state. The object 42 may be selected through a key button of a remote controller, touch pad, etc. and the selection may include click, drag and drop, etc.

A user may obtain feedback that the object is optional, through the cursor 45 displayed as a rollover icon, and that the object has been selected through the cursor 16 displayed as a pressed icon, and may easily recognize the operational state (function) of the user's input without any other information.

Likewise, referring to FIG. 6, in response to the input mode of the display apparatus 100 being a hand gesture input mode, while a plurality of optional objects 51, 52 and 53 and a hand gesture cursor 54 are displayed on the display 130 as in (a) in FIG. 6, a user may select one of the plurality of objects 51, 52 and 53 by input of his/her hand gesture. The controller 160 moves and displays the location of the cursor 54 which corresponds to the location of the user's manipulation, and in response to the location of the user's input becoming adjacent to the predetermined object 53, controls the display 130 to change the image of the cursor 55 into a rollover icon visualizing the operational function. The optional object 53 may be emphasized by highlight, etc.

In response to a user selecting the object 53, the controller 160 controls the display 130 to change the image of the cursor 56 into a pressed icon visualizing the operational state, as in (c) in FIG. 6.

In response to the display apparatus 100 being in operation or loading predetermined data according to a user's input command, such as selection of an object, the controller 160 may change the image of the cursor into an icon showing the current operational state, as in FIG. 7.

For example, in response to the display apparatus 100 performing an operation which corresponds to an input command, the controller 160 may control the display 130 to change the cursor into a waiting icon as in (a) in FIG. 7.

Likewise, in response to the display apparatus 100 loading predetermined data (e.g., data stored in the storage 150, broadcasting data transmitted from the outside through the image receiver 110, etc.) according to an input command, the controller 160 may control the display 130 to change the cursor into a loading icon, as in (b) in FIG. 7.

The waiting and loading icons according to an exemplary embodiment may have an animation effect reflecting a passage of time. A user may recognize that the display apparatus 100 is performing the waiting or loading function, through the cursor displayed as in FIG. 7, and may wait until the function is completed. Thus, convenience to the user may be enhanced.

FIGS. 8 to 11 illustrate an example of displaying a cursor as an icon showing a command that may be input from a current location of a user's input, according to an exemplary embodiment.

Figure 8:
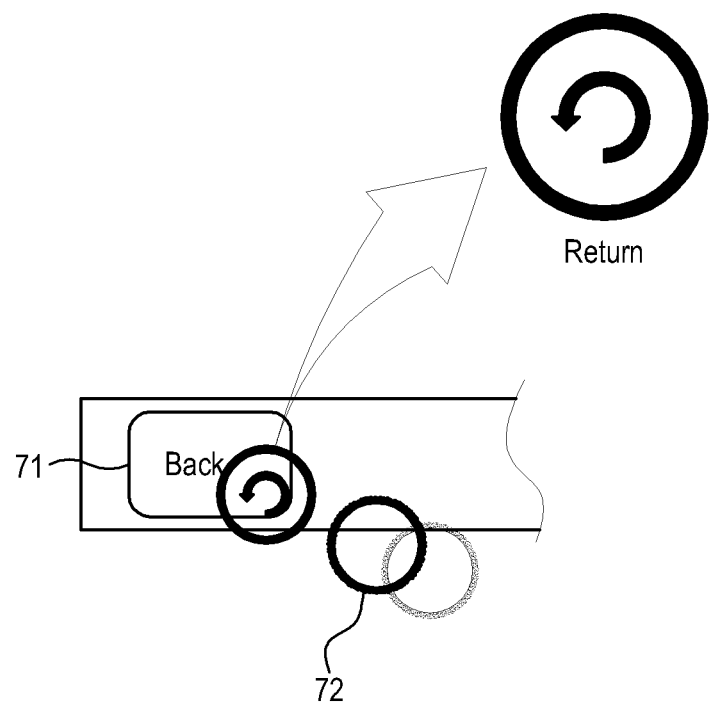
FIGS. 8 to 11 illustrate an example of a cursor as an icon showing a command that may be input at a location of a user's input according to an exemplary embodiment.

More specifically, in response to a user's command being input to move a cursor 72 to an object 71 that may be selected from an non-optional area (i.e., a background area), the controller 160 may display an image of the cursor 72 as an icon showing the operational state, i.e. an icon showing a command that may be input to the object 71. For example, as shown in FIG. 8, in response to a cursor 72 being located in an object 71 in which a Back command may be input to move to a previous web page, etc., the controller 160 controls the display 130 to change an image of the cursor 72 into an icon showing the Back (or return) function.

Figure 9:
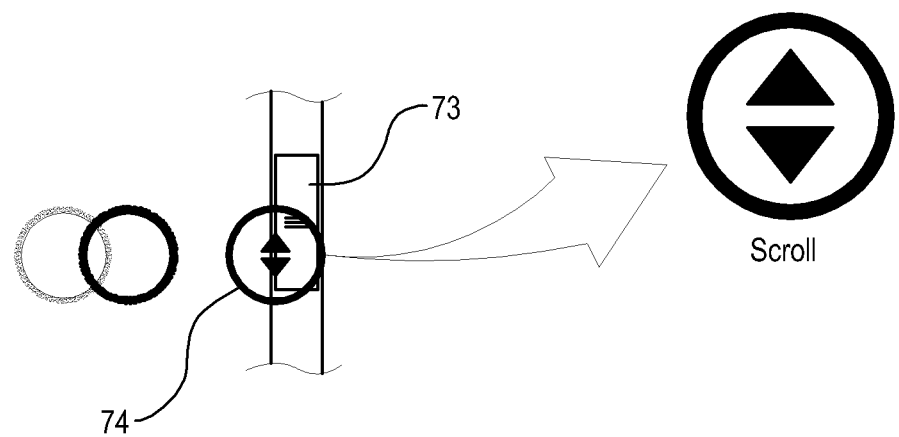
Figure 10:
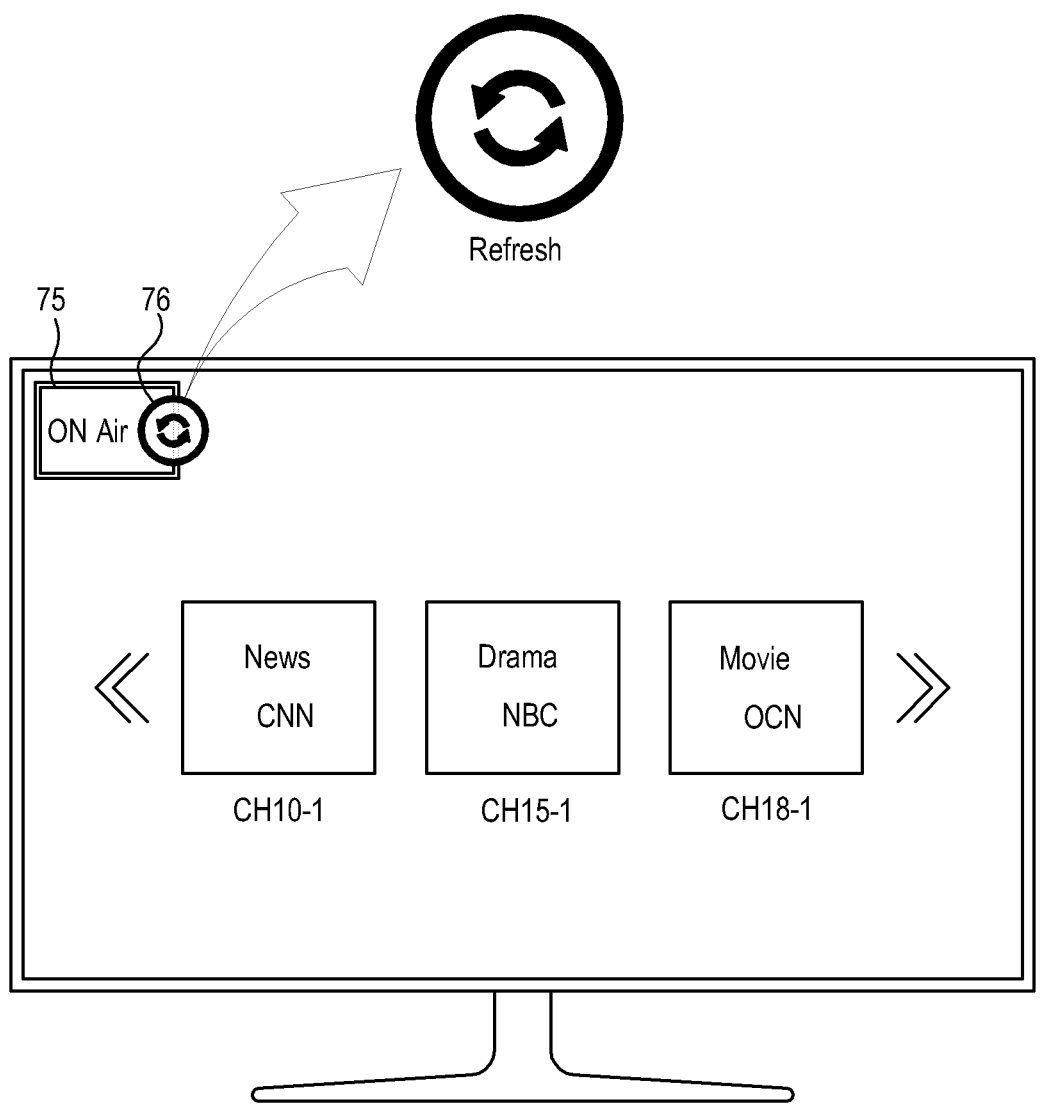

Likewise, referring to FIG. 9, in response to a cursor 74 being located in an object 73 in which a scroll command may be input to move a web page up and/or down, the controller 160 controls the display 130 to change the cursor 74 into an icon showing a scroll function.

In response to a cursor 76 being located in an object 75 in which a real-time update command may be input, the controller 160 controls the display 130 to change the cursor 76 into an icon showing a Refresh function.

Figure 11:
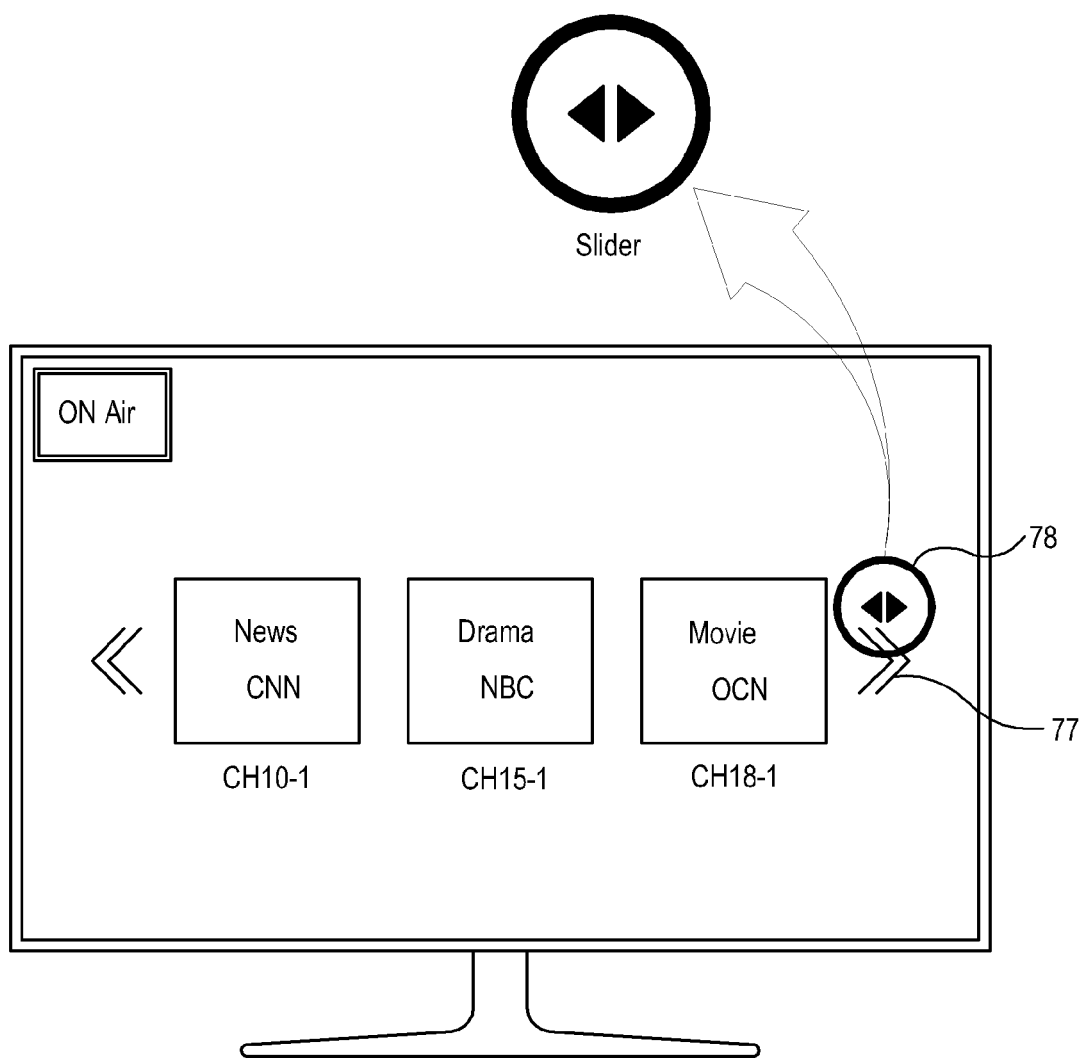

In response to a cursor 78 being located in an object in which a left/right movement command may be input, the controller 160 controls the display 130 to change the cursor 78 into an icon showing a slider function as in FIG. 11.

The operational state of the user's input according to an exemplary embodiment may further include information related to objects that exist at the location of the user's input. The image showing the operational state of the cursor may visualize the function of the display apparatus 100 which corresponds to the information.

Figure 12:
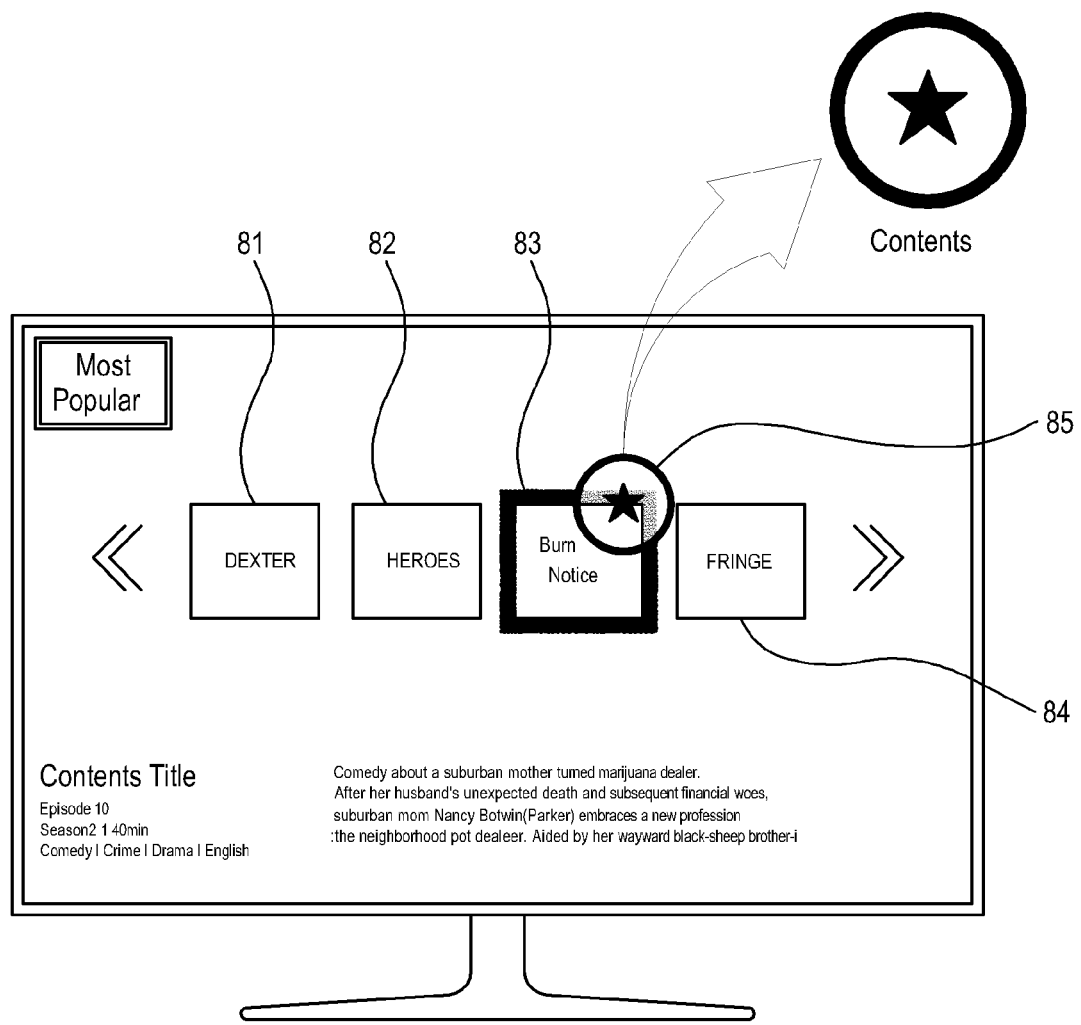

FIGS. 12 and 13 illustrate an example of displaying a cursor as an icon showing information of objects existing at the location of the user's input.

As shown therein, in response to a user selecting an item 83 falling under a predetermined content (e.g., Burn Notice) from a plurality of objects 81, 82, 83 and 84, the controller 160 controls the display 130 to change a cursor 85 located in the selected object 83 into an icon showing the contents. The selected object 83 may be emphasized by highlight, etc. A user may recognize, through the changed cursor 85 that the selected object relates to the content.

Referring to FIG. 13, the display apparatus 100 according to an exemplary embodiment may display a cursor as an icon showing various information (including functions) depending on optional objects. For example, as in FIG. 13, the display apparatus 100 may display a cursor as various icons such as Web Browser, Smart Guide, Apps, Communication, and Help, etc., to enhance the convenience of a user.

Hereinafter, a method of controlling the display apparatus 100 according to an exemplary embodiment will be described with reference to drawings.

Figure 14:
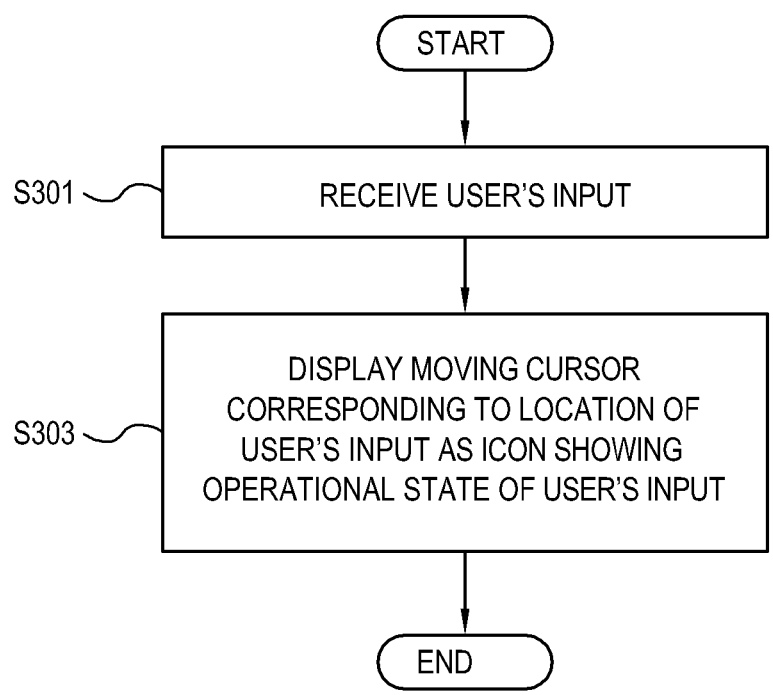
FIG. 14 is a flowchart showing a method of controlling the display apparatus according to an exemplary embodiment.

FIG. 14 is a flowchart showing a method of controlling the display apparatus 100 according to an exemplary embodiment.

As shown therein, the display apparatus 100 may receive a predetermined user's input through the user input unit 140 (S301). The user input 140 may be implemented as a remote controller, a mouse, a keyboard, a voice acquiring apparatus, a touch sensor, a motion sensor, etc. The display apparatus 100 may have a plurality of input modes (e.g., remote controller input, mouse input, keyboard input, gesture input, touch input, and voice input) which corresponds to the implementable user input 140.

The controller 160 controls the display 130 to display a cursor that moves in correspondence with the location of the user's input, and displays the cursor as an icon showing the operational state of the user's input received at operation S301 (S303). The operational state of the user's input may include at least one of the input mode of the user input mode 140 as in FIGS. 2 and 3, the operational state according to the current input mode as in FIGS. 5 to 7, the command that may be input at the location of the user's input as in FIGS. 8 to 11 and the information related to the object existing at the location of the user's input, as in FIGS. 12 and 13. The image showing the operational state of the cursor may visualize the function of the display apparatus 100 which corresponds to at least one of the input mode, command and information.

According to an exemplary embodiment, the pointing cursor that moves in correspondence with the location of the user's input is displayed as the icon showing the operational state of the user's input, and thus a user may intuitively recognize the operational state of the user's input. A user may obtain prompt feedback based on the input result, without suspending his/her interaction, and may more conveniently receive a user's input.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A display system comprising:
   a remote control unit having a gyro sensor configured to sense a movement of the remote control unit and to transmit a signal in response to a user's manipulation with the remote control unit, the signal including motion information based on the sensed movement; and
   a television apparatus having a display configured to display an image thereon of a broadcasting channel based on processing of a broadcasting signal transmitted from a broadcasting channel source, and a controller configured to operate in a pointing mode by controlling the display to display thereon a pointing cursor moved in correspondence with the motion information received from the remote control unit, to receive the signal from the remote control unit, and to change an image of the cursor displayed in the display to an icon showing an operational state to correspond to the signal received from the remote control unit.

2. The display system according to claim 1, wherein the controller is configured to change the image of the cursor into the icon with an animation effect.

3. The display system according to claim 1, wherein, if the cursor is at a location where a scroll command can be input, the controller is configured to control the display to change the image of the cursor into an icon corresponding to a scroll function.

4. The display system according to claim 3, wherein the scroll function icon is displayed with an animation effect.

5. The display system according to claim 1, wherein the remote control unit comprises a button to receive a user input and to transmit a remote control signal based thereon, and
   if a press input of the button is received via the remote control unit, the controller is configured to control the display to graphically change the displayed image of the cursor to provide a visual feedback that the press input via the remote control unit is received.

6. The display system according to claim 5, wherein the visual feedback of the press input is provided by changing only an interior image portion of the displayed image of the cursor.

7. The display system according to claim 3, wherein the remote control unit comprises a button to receive a user input and to transmit a remote control signal based thereon, and
   if a press input of the button is received via the remote control unit, the controller is configured to control the display to graphically change the displayed image of the icon to provide a visual feedback that the press input via the remote control unit is received.

8. The display system according to claim 1, wherein the operational state of the displayed image of the icon corresponds to one of a plurality of input modes.

9. The display system according to claim 8, wherein the plurality of input modes comprises a gesture input mode and a voice input mode.

10. The display system according to claim 1, wherein the gyro sensor further comprises an angular velocity sensor.

11. A television apparatus comprising:
    a display configured to display an image thereon of a broadcasting channel based on processing of a broadcasting signal transmitted from a broadcasting channel source, and
    a controller configured to operate in a pointing mode by controlling the display to display thereon a pointing cursor moved in correspondence with a signal received from a remote control unit and to change an image of the cursor displayed in the display to an icon showing an operational state to correspond to the signal received from the remote control unit, the signal comprising a motion information of the remote control unit,
    wherein the remote control unit is configured to transmit the signal to the television apparatus in response to a user's manipulation with the remote control unit.

12. television apparatus according to claim 11, wherein the controller is configured to change the image of the cursor into the icon with an animation effect.

13. The television apparatus according to claim 11, wherein, if the cursor is at a location where a scroll command can be input, the controller is configured to control the display to change the image of the cursor into an icon corresponding to a scroll function.

14. The television apparatus according to claim 13, wherein the scroll function icon is displayed with an animation effect.

15. The television apparatus according to claim 11, wherein the remote control unit comprises a button to receive a user input and to transmit a remote control signal based thereon, and
    if a press input of the button is received via the remote control unit, the controller is configured to control the display to graphically change the displayed image of the cursor to provide a visual feedback that the press input via the remote control unit is received.

16. The television apparatus according to claim 15, wherein the visual feedback of the press input is provided by changing only an interior image portion of the displayed image of the cursor.

17. The television apparatus according to claim 13, wherein the remote control unit comprises a button to receive a user input and to transmit a remote control signal based thereon, and
    if a press input of the button is received via the remote control unit, the controller is configured to control the display to graphically change the displayed image of the icon to provide a visual feedback that the press input via the remote control unit is received.

18. The television apparatus according to claim 11, wherein the operational state of the displayed icon corresponds to one of a plurality of input modes.

19. The television apparatus according to claim 18, wherein the plurality of input modes comprises a gesture input mode and a voice input mode.

20. The television apparatus according to claim 11, wherein the remote control unit comprises a gyro sensor and an angular velocity sensor configured to sense a movement of the remote control unit and to transmit the signal comprising the motion information based on the sensed movement.

* * * * *